(12) United States Patent
Hoffmann et al.

(10) Patent No.: US 11,154,945 B2
(45) Date of Patent: Oct. 26, 2021

(54) METHOD FOR PRODUCING A GAS-TIGHT METAL-CERAMIC JOIN AND USE OF THE GAS-TIGHT METAL-CERAMIC JOIN

(71) Applicant: TDK ELECTRONICS AG, Munich (DE)

(72) Inventors: Robert Hoffmann, Berlin (DE); Stefan Obermair, Stainz (AT)

(73) Assignee: TDK ELECTRONICS AG, Munich (DE)

( * ) Notice: Subject to any disclaimer, the term of this patent is extended or adjusted under 35 U.S.C. 154(b) by 207 days.

(21) Appl. No.: 16/087,647

(22) PCT Filed: Mar. 22, 2017

(86) PCT No.: PCT/EP2017/056816
§ 371 (c)(1),
(2) Date: Sep. 23, 2018

(87) PCT Pub. No.: WO2017/162735
PCT Pub. Date: Sep. 28, 2017

(65) Prior Publication Data
US 2020/0122257 A1    Apr. 23, 2020

(30) Foreign Application Priority Data

Mar. 23, 2016  (DE) .................... 10 2016 105 456.9

(51) Int. Cl.
*B23K 1/00* (2006.01)
*B23K 35/30* (2006.01)
(Continued)

(52) U.S. Cl.
CPC ........ *B23K 1/0016* (2013.01); *B23K 35/3006* (2013.01); *C04B 37/023* (2013.01);
(Continued)

(58) Field of Classification Search
CPC .. B23K 3/087; B23K 35/3006; B23K 1/0012; B23K 2101/36; B23K 2103/52;
(Continued)

(56) References Cited

U.S. PATENT DOCUMENTS 4,104,693 A * 8/1978 Toda .................... H01T 1/22
                                                313/346 R
4,342,632 A * 8/1982 Heim ................ B23K 35/001
                                                204/192.12
(Continued)

FOREIGN PATENT DOCUMENTS

CN          201515147 U    6/2010
CN          104496513 A    4/2015
(Continued)

OTHER PUBLICATIONS https://www.indiamart.com/proddetail/ceramic-lightning-arrester-13663156548.html, india mart (Year: 2021).*
(Continued)

*Primary Examiner* — Erin B Saad
(74) *Attorney, Agent, or Firm* — Slater Matsil, LLP

(57) ABSTRACT

A method for producing a gas-tight metal-ceramic join is disclosed. In an embodiment a method includes providing at least one ceramic main body having a first end face and a second end face, applying a metallization to at least a partial region of the end faces of the main body, applying a nickel layer to the metallized partial region of the end faces, applying a brazing paste to the metallized partial region of the first end face and/or the second end face of the main body, drying the brazing paste, and firing the brazing paste.

16 Claims, 2 Drawing Sheets

(51) Int. Cl.
*C04B 37/02* (2006.01)
*H01T 4/12* (2006.01)
*B23K 101/36* (2006.01)
*B23K 103/00* (2006.01)

(52) U.S. Cl.
CPC ............ *H01T 4/12* (2013.01); *B23K 2101/36* (2018.08); *B23K 2103/52* (2018.08); *C04B 2237/125* (2013.01); *C04B 2237/405* (2013.01); *C04B 2237/60* (2013.01); *C04B 2237/76* (2013.01)

(58) Field of Classification Search
CPC ................ B23K 35/001; B23K 35/302; B23K 37/0426; B23K 1/0008; B23K 1/0016; B23K 1/0018; B23K 20/002; B23K 20/023; B23K 20/16; B23K 20/233; B23K 20/26; B23K 2101/001; B23K 2101/20; B23K 2103/14; B23K 2103/18; B23K 2201/001; B23K 31/025; B23K 35/005; B23K 35/025; B23K 35/30; B23K 35/3033; B23K 35/322; B23K 35/325; B23K 35/3613; B23K 37/0443
See application file for complete search history.

(56) References Cited

U.S. PATENT DOCUMENTS

| | | |
|---|---|---|
| 4,975,674 A | 12/1990 | Sumiyoshi et al. |
| 4,996,111 A * | 2/1991 | Do-Thoi ............... C04B 37/026 428/432 |
| 5,334,411 A | 8/1994 | Pepin |
| 5,387,441 A | 2/1995 | Do-Thoi et al. |
| 5,525,432 A | 6/1996 | Do-Thoi et al. |
| 6,221,513 B1 * | 4/2001 | Lasater ............... B23K 35/325 428/472 |
| 9,735,551 B2 | 8/2017 | Jung et al. |
| 2003/0066865 A1 | 4/2003 | Tsukaguchi et al. |
| 2005/0116208 A1 * | 6/2005 | Watsuji ............... B23K 35/3613 252/512 |

FOREIGN PATENT DOCUMENTS

| | | | |
|---|---|---|---|
| DE | 714139 C | 11/1941 | |
| DE | 4111189 C1 | 9/1992 | |
| DE | 3886898 T2 | 6/1994 | |
| DE | 112013005344 T5 | 7/2015 | |
| EP | 0356678 A1 * | 3/1990 | ........... C04B 37/026 |
| EP | 0356678 A1 | 3/1990 | |
| EP | 0629596 A2 | 12/1994 | |
| JP | S56070603 A | 6/1981 | |
| JP | S63294640 A | 12/1988 | |
| JP | H0263680 A | 3/1990 | |
| JP | H02186577 A | 7/1990 | |
| JP | H10302933 A | 11/1998 | |
| TW | 271414 B | 3/1996 | |

OTHER PUBLICATIONS https://www.dropout-fuse.com/china-9kv_lightning_arrester_on_pole_transformer_for_high_rise_building_protection-12874790.html, drop out fuses (Year: 2021).*

EP0629596 A2 computer english translation (Year: 2021).*

* cited by examiner

US 11,154,945 B2

METHOD FOR PRODUCING A GAS-TIGHT METAL-CERAMIC JOIN AND USE OF THE GAS-TIGHT METAL-CERAMIC JOIN

This patent application is a national phase filing under section 371 of PCT/EP2017/056816, filed Mar. 22, 2017, which claims the priority of German patent application 10 2016 105 456.9, filed Mar. 23, 2016, each of which is incorporated herein by reference in its entirety.

TECHNICAL FIELD

The present invention relates to a method for producing a gas-tight metal-ceramic connection. The invention also relates to the use of the gas-tight metal-ceramic connection in a surge arrester and also to a surge arrester.

BACKGROUND

Gas discharge arresters generally consist of a perforated ceramic main body (generally a ring of alumina), at the openings of which two metal caps are fitted. The metal caps are normally copper caps, which are attached to the ceramic by means of brazed joints. The ceramic body, brazed joint and metal caps are gas-tight, so that the atmosphere prevailing during the brazing operation is hermetically enclosed in the interior of the gas discharge arrester.

When an electrical voltage is applied to the two metal caps, an electrical arcing occurs within the gas discharge arrester when a triggering voltage typical of the component configuration and gas composition is exceeded. In this way, electrical loads can be protected from surges.

SUMMARY OF THE INVENTION

Embodiments provide an improved method for producing a gas-tight metal-ceramic connection, and thereby an improved gas-tight metal-ceramic connection.

According to an embodiment, a method for producing a gas-tight metal-ceramic connection is provided. The method aims to make a gas-tight metal-ceramic connection available for use in a surge arrester. The surge arrester can be produced by the method. The method comprises the following steps: providing at least one ceramic main body, preferably a plurality of ceramic main bodies. The respective main body has a first end face and a second end face. The end faces are opposite one another. The end faces are connected to one another by a common outer surface or lateral surface of the main body. The lateral surface surrounds a cavity, which passes completely through the main body; applying a metallization to at least a partial region of the end faces of the main body. The metallization may comprise molybdenum, manganese and/or tungsten. Preferably, the metallization is applied to the end faces in the form of a metal paste and fired; applying a layer that can be brazed, for example, a nickel layer, to the metallized region. This serves the purpose of allowing the contact, in particular the connection, of the main body with respect to a brazing material; providing or forming a brazing paste. Applying the brazing paste to the metallized partial region of the first end face and/or the second end face of the main body. Providing and applying the brazing paste serves for forming a single brazing layer. In particular, the brazing layer does not have a multilayered structure. In other words, a brazing monolayer is applied to the end faces of the main body by the process.

The application of the brazing paste to the first and second end faces may, for example, be performed simultaneously. As an alternative to this, it is also possible for brazing paste first to be applied only to one end face and further processed before brazing paste is also applied to the second end face.

Drying and decarburizing the brazing paste. This is performed, for example, by the main body provided with brazing paste being exposed to a temperature of 250° C. to 350° C.

Firing the brazing paste. This is performed, for example, at a temperature of greater than or equal to 790° C. under a prescribed atmosphere, for example, an Ar/H$_2$ atmosphere.

Preferably, the firing of the brazing paste is performed at a temperature between 790° C. and 870° C.

Very thin layers of brazing material can be realized by the method, which leads to a considerable cost saving. This does away with excesses of brazing material, for example, due to the use of a brazing ring instead of the brazing paste. At the same time, a great number of components can be processed simultaneously by the method. As a result, an efficient and low-cost process is provided.

According to an embodiment, the brazing paste is applied to the end faces of the main body in a printing or dipping process. For example, it may be that only one end face is dipped into the brazing paste. As an alternative to this, it is also possible for both end faces to be dipped into the brazing paste simultaneously. This has the advantage that repeating the thermal processes for drying and sintering the brazing paste only has to be carried out once. The dipping of the respective end face into the brazing material leads to a uniform distribution of the brazing material on the end face. An excess of brazing material can be avoided. In this way, a particularly low-cost process is provided.

According to an embodiment, the brazing paste comprises silver and copper. Preferably, apart from other constituents, the brazing paste comprises silver and copper in a ratio of 72%/28%. In this way, a single brazing layer or a brazing monolayer comprising copper and silver is provided.

According to an embodiment, metals (in particular silver and copper) in powder form are provided for forming the brazing paste. Furthermore, a binder and/or a solvent is admixed in a liquid state with the metals. The components are mixed at ambient temperature. This allows the brazing paste to be provided in an easy way.

According to an embodiment, the method comprises the following further steps: providing electrodes. In particular, an electrode is provided for each end face of the main body. The respective electrode has, for example, the form of a metal cap; arranging an electrode respectively on the first end face and the second end face of the main body. Preferably, the respective electrode is at least partially introduced into the cavity from the respective end face. A partial region of the electrode is thereby brought up against the respective end face. Furthermore, the electrodes and the main body are connected to one another, in particular brazed, for producing the gas-tight connection between the electrodes and the main body.

According to an exemplary embodiment, the connection of the electrodes and the main body is performed at a temperature of 790° C. to 870° C. under a prescribed atmosphere, in particular a sintering atmosphere.

According to one aspect, a use of a gas-tight metal-ceramic connection in an arrester for surge protection is described. The gas-tight metal-ceramic connection is preferably produced by the method described above. All of the features and aspects that have been described in connection with the method also apply to the use, and vice versa. The production described above allows a gas-tight connection between the electrodes and the ceramic main body to be achieved in a low-cost and easy way.

According to one aspect, an arrester for surge protection is described. The arrester has a ceramic main body with at least one cavity. The arrester has electrodes at opposite first and second end faces of the main body. The electrodes are brazed to the main body. In particular, a gas-tight connection between the electrodes and the main body was achieved by the method described above. All of the features and aspects that have been described in connection with the method also apply to the arrester, and vice versa. The brazing layer between the respective electrode and the end face has a thickness of less than or equal to 60 µm. In particular, the brazing layer has a smaller thickness than a brazing layer that would be formed due to the use of a brazing ring. In this way, a particularly low-cost arrester is made available. The brazing layer is a monolayer. In other words, the brazing layer comprises a single or sole layer. This single layer comprises copper and silver. This single layer has a thickness of less than or equal to 60 µm, preferably less than or equal to 40 µm.

According to an embodiment, the brazing layer comprises silver and copper in a ratio of 72%/28%.

BRIEF DESCRIPTION OF THE DRAWINGS

The drawings described below should not be regarded as true to scale. Rather, for better representation, individual dimensions may be shown as increased or reduced in size or even distorted.

Elements that are the same as one another or perform the same function are provided with the same designations.

In the drawings:

FIG. 1 shows a method step in the production of a gas-tight metal-ceramic connection;

FIG. 2 shows a method step in the production of a gas-tight metal-ceramic connection;

FIG. 3 shows a method step in the production of a gas-tight metal-ceramic connection;

FIG. 4 shows a method step in the production of a gas-tight metal-ceramic connection;

FIG. 5 shows an arrester for surge protection according to the prior art; and

FIG. 6 shows an arrester for surge protection with a gas-tight metal-ceramic connection according to the invention.

DETAILED DESCRIPTION OF ILLUSTRATIVE EMBODIMENTS

Figure 5:
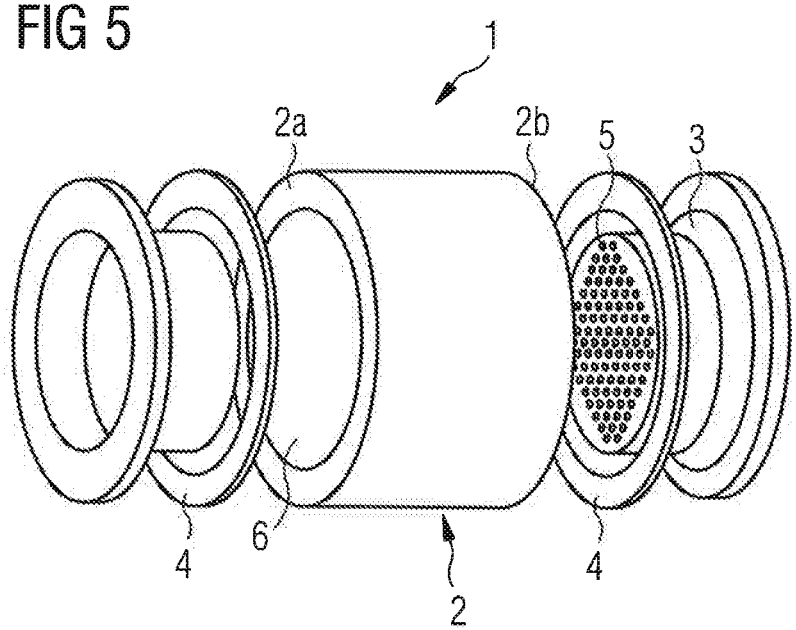

Gas-tight metal-ceramic connections are used, for example, in surge arresters or switching spark gaps. A corresponding surge arrester 1 according to the prior art is shown in FIG. 5. Decisive in the production of such components is the gas-tight connection of the electrodes 3 to a ceramic main body 2. For this purpose, the main body 2 is metallized on the end faces 2a, 2b, and generally nickel-coated, which provides a brazable surface.

Until now, a brazing ring 4 has been used. This generally consists of a silver-copper eutectic (Ag72, CU28). The brazing ring is manually put in place during the production process, to flow later in the brazing furnace at temperatures of around 820° C. and to produce the desired gas-tight connection when it cools down. Previously used brazing rings 4 have a thickness of 60 µm to 100 µm.

In principle, a gas-tight connection could also be produced with less brazing material, but such thin brazing rings are not easy to handle. In particular, the following defects have been found when brazing rings of less than 60 µm are used with existing production tooling:

bent rings (resulting in open brazed seams), rings with kinks/bends (resulting in open brazed seams), rings sticking to one another, resulting in twice the amount of braze on each end face, and consequently, in the further course of the production process, an increased amount of silver inside the component and electrical faults, components that are open on one side, since the brazing ring has not been correctly taken up by the placing tool or has remained stuck to it.

In order to avoid the disadvantages listed above, a method for producing a gas-tight metal-ceramic connection is described below. FIGS. 1 to 4 show method steps in the production of the gas-tight metal-ceramic connection.

Figure 1:
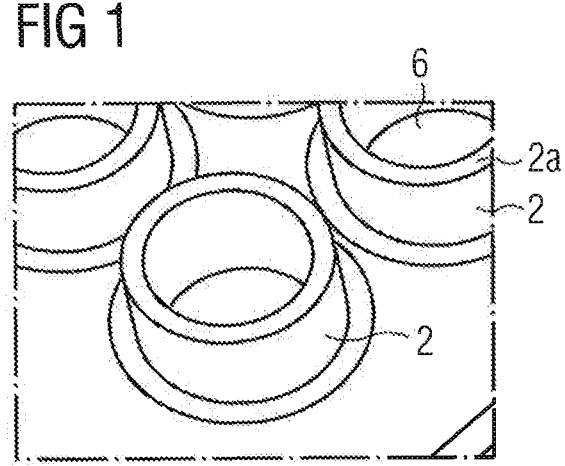

In a first step, at least one ceramic main body 2 is provided (see FIG. 1). The main body has a cavity 6. The cavity 6 passes completely through the main body 2. The main body 2 is preferably formed in an annular or cylindrical manner. The main body 2 has a first end face 2a and a second end face 2b. The end faces 2a, 2b are arranged opposite one another. The end faces 2a, 2b are connected to one another by a lateral surface of the main body 2. Preferably, a multiplicity of ceramic main bodies 2, for example, 100, 200 or 500 main bodies 2, are provided for the production process.

In a further step, the end faces of the main body 2 are metallized. For example, for this a metal paste is applied to the end faces 2a, 2b and fired. The metal paste may, for example, comprise molybdenum, manganese and/or tungsten.

In a further step, the metallization is provided with a nickel layer. The nickel layer is provided for ensuring a connection between the metallization and a brazing compound.

Figure 2:
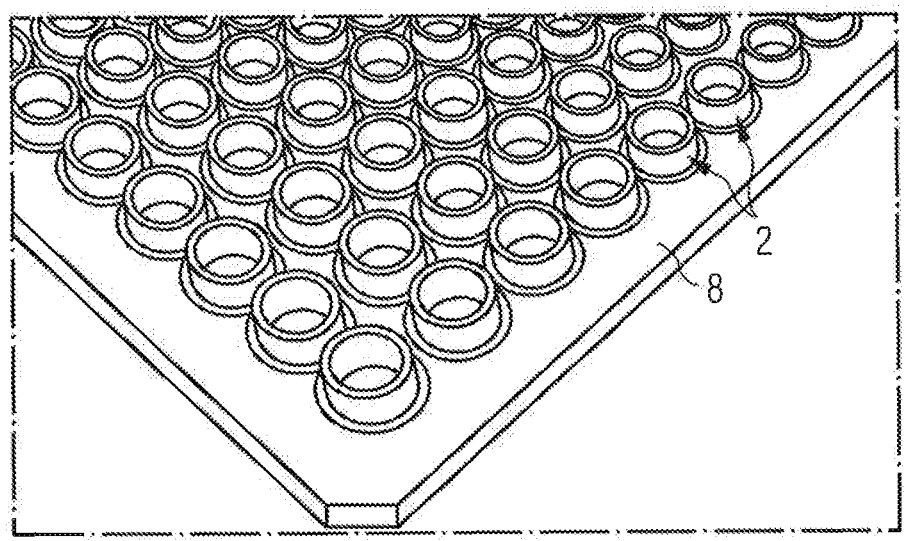

The main bodies 2 are subsequently inserted next to one another into a holder 8 (see FIG. 2). In an alternative embodiment, the metallization of the main bodies 2 and/or the application of the nickel layer may also be performed after introduction of the main bodies 2 into the holder 8.

The holder 8 is, for example, a base plate with openings for receiving the main bodies 2. The main bodies 2 may be mounted in the holder 8 in such a way that an end face (for example, the first end face 2a) protrudes out of the base plate (see, for example, FIGS. 2 and 3). As an alternative to this, the holder 8 may also have through-openings for the main bodies 2, so that both the first end face 2a and the second end face 2b protrude out of the holder 8 (see FIG. 3). This has an influence on the subsequent step of wetting with brazing compound or brazing paste 7, as explained later in detail.

In a further step, the brazing compound 7 is prepared. After completion of the gas-tight metal-ceramic connection, the brazing compound 7 substantially comprises copper and silver. Preferably, after it has been dried and fired, the finished brazing compound 7 comprises silver and copper in a ratio of 70%/30% to 75%/25%. The finished brazing compound 7 serves for providing a single brazing layer or a brazing monolayer comprising copper and silver.

For producing the brazing compound 7, silver powder is provided. Furthermore, copper powder is provided. As further constituents, one or more binders, for example, ethyl cellulose, and also a solvent are provided, the solvent influencing in particular the viscosity of the paste 7. The components are mixed with one another at ambient temperature, so that a paste 7 with the following constituents is obtained:
- silver powder (Ag) accounting for 35 to 65% by weight, preferably 59% by weight;
- copper powder (Cu) accounting for 13 to 30% by weight, preferably 23% by weight;
- binder accounting for 0.5 to 15% by weight, preferably 3% by weight;
- solvent accounting for 5 to 40% by weight, preferably 21% by weight.

In a further step, the respective main body 2, and in particular, the metallization is cleaned of contaminants. Subsequently, the brazing compound 7 is applied to the end faces 2a, 2b, in particular to the metallized regions of the end faces 2a, 2b. For this purpose, the main bodies 2 may be partially dipped into the brazing compound 7 (known as the "dip-printing process").

Figure 3:
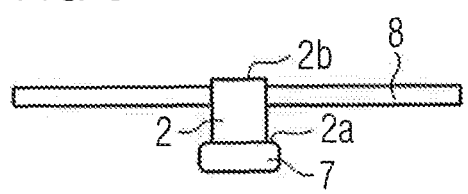
Figure 4:
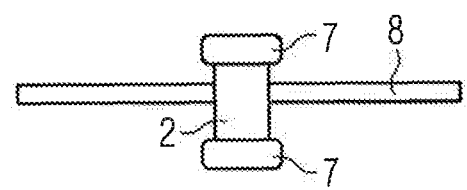

According to a first embodiment, first the first end face 2a is dipped into the brazing compound 7. In the case of this embodiment, the main bodies 2 are arranged in the holder 8 in such a way that first only the first end face 2a, but not the second end face 2b, protrudes out of the holder 8. The main bodies 2 are dipped into the brazing compound 7 with the first end face 2a; the second end face 2b initially remains unwetted (FIG. 3).

Subsequently, the brazing compound 7 applied to the first end face 2a is dried and fired, as described in still greater detail below. Only after that is the brazing compound 7 applied to the second end face 2b, and the drying and firing process is subsequently repeated. According to a further embodiment, both end faces 2a, 2b are dipped into the brazing compound 7 simultaneously and are subsequently further processed (see FIG. 4). This has the advantage that the subsequent drying and firing steps do not have to be carried out repeatedly. In the case of the step of wetting with brazing compound 7, about 13 mg of brazing compound are in each case distributed uniformly on the first end face 2a and on the second end face 2b.

In a subsequent step, the main body 2 is sintered. The main body 2 is heated through in order to dry the brazing compound 7. In this case, the main body 2 is first exposed to a temperature of approximately 350° C. for about 15 minutes. During this thermal step, the binders and solvents listed above evaporate. The weight of the brazing compound 7 applied to each end face 2a, 2b in this step is reduced.

Subsequently, the main body 2 is introduced into a furnace—for firing the brazing compound 7 on the metallization—and preheated at a temperature of approximately 820° C. to 830° C. in a prescribed atmosphere for about 3 minutes. For example, the gas composition in the furnace comprises $Ar/H_2$ in a ratio of 82%/18%. Furthermore, the weight of the brazing compound 7 for each end face 2a, 2b is reduced further. After this step, the pre-brazing process has been completed.

Subsequently, the main body 2 can be brazed under standard conditions. For this purpose, two electrodes 3 are provided for each main body 2. The electrodes 3 are, for example, in the form of metal caps. The electrodes 3 are arranged on the end faces 2a, 2b of the main body 2. Subsequently, the main body 2 is heated through by the electrodes 3 at a prescribed temperature (about 850° C.) under a predetermined atmosphere (brazing operation).

The method described above for producing a gas-tight metal-ceramic connection has the advantage that very thin brazing layers can be realized. Furthermore, a brazing monolayer, that is to say a brazing layer consisting of only a single layer, can be realized. For example, the brazing layer 7 between the electrode 3 and the end face 2a, 2b has a thickness of less than or equal to 40 μm. This completely dispenses with standard brazing rings with thicknesses of 60 μm or more. Furthermore, less excess than in the case of the standard processes with brazing rings 4 is produced by the dipping method. Consequently, very compact components can be produced in a low-cost way by the method described above.

Furthermore, very many components can be pre-brazed simultaneously by the method described. This does away with the risk of brazing rings 4 that are bent, kinked, stuck together or forgotten.

Figure 6:
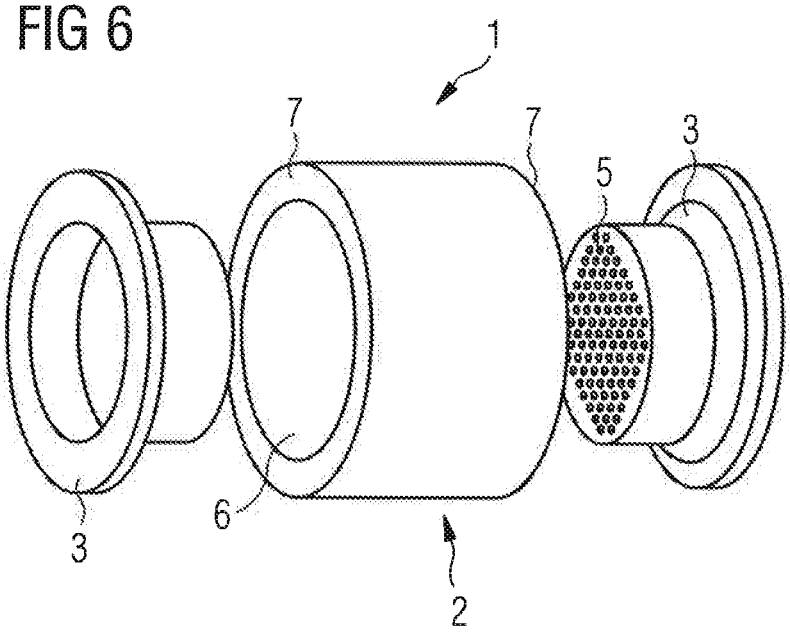

The gas-tight main bodies 2 may, for example, be used in a surge arrester or switching spark gap, as shown in FIG. 6.

The arrester 1 shown in FIG. 6 has a first electrode 3 and a second electrode 3. The electrodes 3 in each case comprise an electrically conductive material. The electrodes are formed as metal caps. An activation material 5, for example, graphite 5, may be arranged on inner surfaces of the electrodes 3. The activation material 5 is provided for facilitating triggering and guiding the sparking.

The arrester 1 has a ceramic main body 2 with a cavity 6 for allowing an electrical discharge between the electrodes 3 when there is a surge. When there is a surge, a discharge, in particular an arc discharge, is consequently intended to take place between the electrodes 3 in the discharge space. The cavity 6 may be filled with a gas, in particular a noble gas. In particular, the cavity 6 is filled with the sintering gas described above.

The electrodes 3 are arranged on the end faces 2a, 2b of the main body 2 and, for example, protrude partially into the cavity 6. For the gas-tight connection between the electrodes 3 and the main body 2, the brazing compound or brazing layer 7 described above is formed on the end faces 2a, 2b. By the method described above, the gas-tight metal-ceramic connection between the electrodes 3 and the main body 2 is achieved by way of the brazing compound 7. By contrast with an arrester 1 according to the prior art (see FIG. 5), the finished arrester 1 is distinguished by the fact that the brazing layer between the electrode 3 and the end face 2a, 2b is very thin. In particular, the brazing layer 7 has a thickness of less than or equal to 60 μm. The brazing layer 7 comprises silver and copper, preferably in a ratio of 72% to 28%.

The description of the subjects specified here is not restricted to the individual specific embodiments. Rather, the features of the individual embodiments can—as far as technically feasible—be combined with one another in any desired manner.

The invention claimed is:
1. A method comprising:
providing at least one ceramic main body having a first end face and a second end face;
applying a metallization to at least a partial region of the first end face of the ceramic main body;
applying a metallization to at least a partial region of the second end face of the ceramic main body;
applying a nickel layer to the metallized partial region of the end faces;
applying a brazing paste to the metallized partial region of the first end face and to the metallized partial region of the second end face of the ceramic main body;
drying the brazing paste;
firing the brazing paste;
arranging a first metal electrode on the first end face of the ceramic main body and arranging a second metal electrode on the second end face of the ceramic main body after applying the brazing paste; and connecting the first and second electrodes and the ceramic main body thereby producing a gas-tight connection between the metal electrodes and the ceramic main body.

2. The method according to claim 1, wherein the ceramic main body is formed in an annular or cylindrical shape comprising a cavity, and wherein the end faces are arranged opposite one another and are connected to one another by a lateral surface of the ceramic main body.

3. The method according to claim 1, wherein applying the brazing paste to the first and second end faces comprises applying the brazing paste to the first and second end faces simultaneously.

4. The method according to claim 1, wherein the brazing paste is first applied to the first end face, dried and then applied to the second end face and dried.

5. The method according to claim 1, wherein the brazing paste is applied to the end faces of the ceramic main body in a printing process.

6. The method according to claim 1, wherein the brazing paste is applied to the end faces of the ceramic main body in a dipping process.

7. The method according to claim 1, wherein the brazing paste comprises silver and copper.

8. The method according to claim 1, wherein, apart from other constituents, the brazing paste comprises silver accounting for 35 to 65% by weight of the brazing paste and copper accounting for 13 to 30% by weight of the brazing paste.

9. The method according to claim 1, wherein metals in powder form are provided for forming the brazing paste, and wherein a binder and a solvent are admixed in a liquid state with the metals.

10. The method according to claim 1, wherein the connection of the first and second electrodes and the ceramic main body is performed at a temperature of 790° C. to 870° C. under a prescribed atmosphere.

11. The method according to claim 1, wherein the ceramic main body comprises a cavity, and wherein the first and second electrodes on the end faces are at least partially introduced into the cavity and connected to the ceramic main body by the brazing paste.

12. The method according to claim 1, wherein a plurality of ceramic main bodies are provided, and wherein the ceramic main bodies are inserted next to one another into a holder.

13. A method comprising:
providing at least one ceramic main body having a first end face and a second end face, the ceramic main body being formed in an annular or cylindrical shape comprising a cavity, and the end faces being arranged opposite one another and connected to one another by a lateral surface of the ceramic main body;

applying a metallization to at least a partial region of the first end face of the ceramic main body;

applying a metallization to at least a partial region of the second end face of the ceramic main body;

applying a nickel layer to the metallized partial region of the end faces;

applying a brazing paste to the metallized partial region of at least one of the first end face and the second end face of the ceramic main body;

drying the brazing paste;

firing the brazing paste;

arranging a first metal electrode on the first end face of the ceramic main body and arranging a second metal electrode on the second end face of the ceramic main body after applying the brazing paste; and connecting the first and second electrodes and the ceramic main body thereby producing a gas-tight connection between the metal electrodes and the ceramic main body.

14. The method according to claim 1, wherein connecting the first and second electrodes and the ceramic main body comprises brazing the first and second electrodes and the ceramic main body thereby producing the gas-tight connection between the metal electrodes and the ceramic main body.

15. The method according to claim 1, wherein the first electrode has a form of a metal cap, and wherein the second electrode has a form of a metal cap.

16. A method comprising:
providing at least one ceramic main body having a first end face and a second end face;

applying a metallization to at least a partial region of the first end face of the ceramic main body;

applying a metallization to at least a partial region of the second end face of the ceramic main body;

applying a nickel layer to the metallized partial region of the end faces;

applying a brazing paste to the metallized partial region of the first end face and to the metallized partial region of the second end face of the ceramic main body;

drying the brazing paste;

firing the brazing paste;

arranging a first metal electrode on the first end face of the ceramic main body and arranging a second metal electrode on the second end face of the ceramic main body after firing the brazing paste; and connecting the first and second electrodes and the ceramic main body thereby producing a gas-tight connection between the metal electrodes and the ceramic main body.

* * * * *